United States Patent Office 3,761,330
Patented Sept. 25, 1973

3,761,330
FILLER RICH POWDER AND METHOD OF MAKING
Richard L. Lou, Rocklin, and Arthur Katzakian, Jr., and Stanley C. Burket, Sacramento, Calif., assignors to Aerojet-General Corporation, El Monte, Calif.
No Drawing. Filed July 29, 1968, Ser. No. 748,568
Int. Cl. C06b 11/00
U.S. Cl. 149—21                8 Claims

ABSTRACT OF THE DISCLOSURE

This invention relates to a method of modifying solid composite propellant combustion or processing properties or both whereby all or part of the solid filler is concentrated in a filler-rich powder of controlled particle size and shape which is then dispersed in a binder-rich matrix to form a composite solid propellant. This invention includes, but is not limited to, a method of forming the filler-rich powder which comprises loading a high percentage of small particle-size solid fillers in a suitable binder, forming a cake, and subsequently grinding of the cake in conventional equipment to yield a powder of any desired particle size distribution. The powder thus obtained is then formulated into a solid propellant by the use of additional binders and usually, but not necessarily, some additional filler solids.

BACKGROUND OF THE INVENTION

The processing of solid rocket propellants entails the handling of viscous slurries carrying high loadings of small solid particles. Effective processing at high solids levels requires careful control of the particle sizes, shapes and particle size distribution. The standard practice in solid composite propellant development is to use approximately 7 parts coarse to 3 parts fine with the particle diameter ratio of $\geq 10$ whenever possible. In addition, it is desirable to avoid particle shapes, such as needles or flakes, in which one particle dimension is significantly different from the others. Recently, it has been found necessary to relinquish such control in particle shape or size distribution for some other over-riding considerations, such as to achieve effective combustion, or extinguishment, or to achieve unusually high burning rate. For example, in preparing the boron-rich propellants for air augmented solid rockets, effective combustion of the propellant requires the use of extremely fine oxidizer ($NH_4ClO_4$) and boron particles, thus limiting the control which can be exerted over particle size distribution. Another example is the necessity of using extremely fine $NH_4ClO_4$ in high concentrations to achieve high burning rates. Another example is the use of flake aluminum particles to improve propellant extinguishment characteristics at a significant loss of processability.

Broadly, the present invention overcomes the processing, mixing and casting difficulties previously encountered by controlling the shape and particle size distribution of solids which enter into the final propellant mix. Also the control over particle concentration distribution may be used to achieve useful propellant properties such as to increase burning rate, to increase combustion efficiency of difficult-to-burn species, and possibly to reduce temperature sensitivity of burning rate.

SUMMARY OF THE INVENTION

Briefly, the present invention comprises a filler-rich powder adapted for incorporation in a solid propellant comprising by weight from 80 to 99% of filler particles and 20 to 1% of a polymeric binder, with at least 95% of the filler particles being in the range of about 0.1 micron to about 2,000 microns in size. The invention also includes the preparation of filler-rich particles of selected sizes and without needles or flakes by loading a high percentage of small particle-size fillers into a suitable binder. In the principal example shown this has been accomplished by forming the fillers and binder into a cake, and grinding the cake to yield a solid-rich powder of improved shape and of any desired particle size distribution for satisfactory processing. Also, a control of the distribution of filler particles, or a controlled concentration gradient may be exercised by selecting the desired solids composition to be used in the powder preparation.

In a preferred practice of the present invention, the boron or aluminum and ammonium perchlorate solid fillers, both of fine size (typically about 2 to 6 microns) are mixed with a suitable binder, typically a curable polymer, together with such burning rate catalysts or other additives as may be desired. The preparation of the filler-rich powder may be accomplished by solution precipitation, spray drying of suitable binder solutions containing suspended solids, spraying of fluidized solids with appropriate binder solutions or by cake formation followed by grinding. The latter technique has been used to illustrate the invention because of its simplicity. In this latter approach, after mixing to interblend the particles with the polymer, the mass is cured to form a substantially unitary mass or cake. This mass is then ground in any conventional grinding equipment to whatever size is desired, and normally to 20 to 325 mesh, and the mesh unit designating the screen size as the number of openings per linear inch. Any particle size distribution required is provided by the mixing of several portions, each of different particle size as well as with the uncaked fillers. In addition, if the initial filler particles are in the shape of needles and flakes, this invention offers a method of avoiding these shapes. It can be seen that our invention provides control over the particle size and shape of the filler-rich powder. The resulting powder is directly adapted for incorporation in any conventional solid rocket propellant formulation.

By use of the boron or aluminum or oxidizer rich powder prepared as described it is possible to improve propellant combustion behavior, reduce the difficulty in achieving high propellant burning rates and ultimately to reduce temperature sensitivity of propellant burning rate. These benefits result from the controlled particle concentration distribution as explained later.

Accordingly, it is an object of the present invention to provide a filler-rich powder of any desired size distribution, and, in some cases, of improved shape, particularly adapted for satisfactory processing into solid rocket propellants.

Furthermore, it is an object of the present invention to provide propellants of improved combustion behavior, high burning rate, and low burning rate temperature sensitivity by the control of particle concentration distribution.

These and other objects and advantages of the invention will become apparent from a more detailed description which follows:

DESCRIPTION OF PREFERRED EMBODIMENTS

This invention, therefore, offers two principal advantages:

(1) Desired particle size distribution for the final propellant processing regardless of the original filler particle size. In some cases, improved shape may also be achieved.

(2) Desired control over solid particle concentration distribution since the "powder" composition is substantially different from the composition of the end product.

These advantages, when properly utilized, lead to improved combustion, ballistic and processing properties. The term "improved processing" is to be interpreted broadly to include any and all benefits in processing associated with the controlled "powder" shape and particle size distribution regardless of the original filler particle shape or size. Such benefits include improved mix viscosity and castability, greater ease of solid material handling due to improved shape and higher bulk density, greater safety due to reduced tendency for spontaneous combustion or explosion associated with fine oxidizer or fuel particles etc. The binder materials for the preparation of the filler-rich powder and for the preparation of the final propellant may be the same, although the former may vary with the choice of method for preparation of the filler-rich powder; thus, for example, a high-modulus, fracturable binder is preferred for caking whereas an elastomeric binder is preferred for final propellant preparation.

In the principal example used in the description of the present invention, the binder material utilized in the cake generally has the following characteristics:

(1) Low initial viscosity for high solids loading;
(2) Capable of forming a cake of suitable characteristics for optimum particle properties, that is, high modulus for satisfactory grinding, low porosity and swelling to minimize binder absorption in the subsequent mixing, and high strength so that the cake does not crumble into excessive amounts of fine powder or break up into fine particles during subsequent mixing with elastomeric binder.

To enhance solids loading in the filler-rich powder, a volatile solvent can be used to reduce the initial viscosity in the powder preparation process. The solvent can be removed by evaporation during spray drying or at other suitable process points such as the curing of the cake. Although high cross-link density organic polymers such as urethane and epoxy systems are generally used in cake preparation, other binding agents such as inorganic polymers and gelling and coagulating materials may also be used, such as various types of silanes and Carbopol 940 gelling compound.

The benefits of filler-rich powder as described in this invention is of general nature regardless of the method of "powder" preparation. Other methods of powder preparation, such as solution precipitation or spray drying of suitable binder solutions containing suspended solids, or spraying of molten binder with suspended solids etc., are capable of achieving the same benefits. Obviously, the desired proportions of the polymer in the filler-rich powder will vary somewhat depending on the process selected.

This invention is useful in achieving the above objectives in fuel-rich propellants for air augmented rockets and in high burning rate propellants, but is not limited to these applications only. Although boron fuel has been generally used in the former, this invention is equally applicable to the use of other fuels such as carbon black, boron carbide, aluminum boride, zirconium, etc.

The following examples are presented solely to illustrate the invention and should not be regarded as limiting in any way. In the examples, the parts and percentages are by weight, unless otherwise indicated.

EXAMPLE I

The following example described the preparation of a filler-rich powder according to the present invention.

(A)

| Ingredients: | Gms. |
|---|---|
| 3μ boron powder (B) | 300 |
| Ammonium perchloride (AP) MA grind (6μ) | 150 |
| Polyurethane binder (PU) | 23 |
| Reagent grade acetone, 350 ml. | |

(B)

| Composition of polyurethane binder: | Parts |
|---|---|
| Glyceryl monoricinoleate (GMRO) | 1.8 |
| Diethanol oleamide (DEO) | 0.05 |
| Toleuene diisocyanate (TDI) | 1.1 |
| Ferric acetyl acetonate (FeAA) | 0.05 |

All binder ingredients except FeAA were weighed into a 1-liter beaker. Then, acetone, FeAA, boron, and $NH_4ClO_4$ were added in the order named. The mixture was cast into a flat container and stirred with a spatula while vibrating at room temperature until very viscous so that solids did not settle out. The acetone was partially removed in this step. The material was heated in 135° F. oven until acetone was removed and binder polymerization was complete. The cake was broken into nominal ¼ to ½ inch diameter chunks. The chunks were ground in a meat grinder to 20 to 200 mesh.

EXAMPLE II

| Material: | Weight percent |
|---|---|
| Above material of Example I | 80 |
| Polybutadiene binder (PBD) | 20 |

The binder used was prepared as follows:

| Material: | Weight percent |
|---|---|
| Normal butyl ferrocene | 2.00 |
| Silicone oil | 0.005 |
| Lecithin | 0.195 |
| Chromium oleate | 0.100 |
| Isodecyl pelargonate | 6.00 |
| Polybutadiene prepolymer having carboxy terminal groups (100 equiv.) | 10.75 |
| Epichlorohydrin adduct of 2,2-(4-hydroxyphenyl)propane (40 equiv.) | 0.44 |
| Epichlorohydrin adduct of para amino phenol (60 equiv.) | 0.38 |
| Methyl aziridinyl phosphine oxide | 0.13 |
| | 20.000 |

All liquids were charged into the propellant mixer except the cure catalyst which was dissolved in twice its weight of isodecyl pelargonate plasticizer. The temperature was increased to 135° F. The filler-rich particles were added in increments with 10 minute mixing between additions. Temperature of the mix was maintained at 135° F. The material was mixed under 28 in. vacuum for 15 minutes. The plasticizer-catalyst solution was added and mixed for 10 minutes under 28 in. vacuum. The propellant was cast under vacuum with vibration and cured for 5 days at 135° F.

The composition of the filler-rich powder and the final propellant are summarized below to illustrate the difference in distribution of solid particles:

| | Parts | Weight percent |
|---|---|---|
| Composition, filler-rich powder: | | |
| B | 300 | 63.43 |
| AP | 150 | 31.71 |
| PU | 23 | 4.86 |
| Total | 473 | 100.00 |
| Propellant composition, weight percent: | | |
| 80.00 filler-rich powder: | | |
| B | | 50.74 |
| AP | | 25.37 |
| PU | | 3.89 |
| 20.00 PBD | | 20.00 |
| Total | | 100.00 |

As shown above, the resultant propellant has a ballistic solids (B+AP) loading of 76.11%. These solids are not randomly distributed as would be the case in a conventionally processed propellant, but instead the solids are concentrated in 3.89 wt. percent of polyurethane binder. Therefore, the resultant propellant is composed of distinctly different phases of high-solid-content or filler-rich powder in a matrix of a PBD bindner. This controlled "Non-uniformity" may be utilized to maximize certain desired characteristics. Examples III and IV illustrate the increase in burning rate and improved combustion by this approach.

EXAMPLE III

Two propellants of identical end composition were prepared, No. 1 by conventional processing, and the other (No. 2) by the process of the present invention. The end composition of each propellant was 41.6% by weight boron, 20.2% by weight ammonium perchlorate, and 38.2% polyurethane binder. The propellant produced by conventional processing had a burning rate of 0.06 inch per second at 800 p.s.i.a. and 80° F. The propellant prepared by the process of the present invention had a burning rate of 0.25 inch per second under the same conditions.

In the preparation of the propellant in accordance with the present invention, the boron cake had a composition of 64% boron, 31% ammonium perchlorate, and 5% polyurethane. 65% of the ground cake was mixed with 35% polyurethane binder to make up the final propellant.

EXAMPLE IV

In the following example, Propellant A was prepared by conventional processing techniques, Propellant B was prepared by the process of the present invention. It will be noted that both Propellants A and B had the same final overall composition by weight.

| Propellant | A | B [1] |
|---|---|---|
| Percentage by weight: | | |
| Boron | 55 | 55 |
| Ammonium perchlorate | 18 | 18 |
| Polyurethane binder | 27 | 27 |
| Filler-rich powder, composition by weight percent: | | |
| Boron | | 71.6 |
| Ammonium perchlorate | | 23.4 |
| Diethanol-oleamide-toluene diisocyanate binder | | 5.0 |
| Burning rate, inch per second: | | |
| Pressure: | | |
| 400 p.s.i.g | 0.0401 | 0.0568 |
| 800 p.s.i.g | 0.0628 | 0.0949 |
| 1,500 p.s.i.g | 0.1016 | 0.1349 |

[1] 76.8 filler-rich powder to 23.2 elastometric binder.

The ash from Propellant A was noticeably harder than that from Propellant B, and the burning rate of Propellant B was about 40% to 50% higher than A. The formation of hard ash has been shown to result in inefficient combustion in a dual-chamber air-augmented rocket.

The improved combustion and higher burning rate of Propellant B result from the high concentration of AP in the filler-rich powder. In other words, the propellant combustion and burning rate reflect primarily that of the powder, which has 95% ballistic solids and 23.4% AP, instead of that of the final propellant, which has only 73% ballistic solids and 18% AP. Higher AP percent gives a higher burning rate and improved combustion.

For still higher burning rate, a great concentration of AP in the powder may be obtained simply by removing some of the boron from powder preparation and adding it directly to the final propellant mix as shown in the following example:

| | Weight percent |
|---|---|
| Composition, filler-rich powder: | |
| B | 50 |
| AP | 45 |
| PU | 5 |
| Propellant composition, weight percent: | |
| 40 filler-rich powder, B | 55 |
| 30 B —AP B | 18 |
| 25 PU | 27 |
| Total | 100 |

The present invention represents a substantial breakthrough in the field of solid propellant technology in that it offers a new approach to achieve unique propellant properties by adjusting "powder" composition which is unrestricted by the constraints of the final propellant. Also it has the potential of permitting the incorporation of higher amounts of extremely fine filler particles in the propellant than has been heretofore possible. In this way, novel propellants having improved burning rates and other performance properties are obtained. The present invention is not limited to the use of any particular propellant binders or other additives such as burning rate additives, plasticizers, oxidizers, stabilizers, fillers and the like, but rather, is applicable to the full range of solid rocket propellant formulations. The basic principle of the present invention is the provision of a means whereby filler-rich particles of any particular desired composition and size distribution can be produced. Hence, the advantage provided by the invention is not dependent upon the composition of the balance of the propellant, although as will be apparent to those skilled in the art, the extent of the advantages obtained by the practice of the present invention will vary somewhat from one formulation to another.

EXAMPLE V

A filler-rich powder (FRP) containing ammonium perchlorate, aluminum and silane inorganic polymer has been prepared. The filler-rich powder contains 90% ammonium perchlorate ($6\mu$ MA grind), 5% aluminium powder (spherical $5\mu$), and 5% Silane Z–6020 (N-$\beta$-aminoethyl-$\gamma$-aminopropyl trimethoxysilane). The process was carried out at room temperature, 180 grams of MA ammonium perchlorate and 10 grams of H–5 aluminum powder were mixed together in a 2-liter stainless steel breaker. In a separate beaker 10 grams of Silane Z–6020 was added to 100 grams of methanol with stirring and this solution immediately added to the ammonium perchlorate/aluminum mixture with stirring. More methanol may be used if needed. The resultant wet slurry was spread out in a tray and methanol allowed to evaporate off in air. When the cake was semi-dry it was broken into small pieces and then placed in a vacuum oven or evaporator to finish flashing off the methanol. During this period a considerable amount of ammonia was given off as the amino-group of Z–6020 reacts with $NH_4ClO_4$. When the powder was completely dry it becomes quite hard and may be ground to achieve the particle size desired for use. The resulting FRP then was an intimate mixture of extremely fine $NH_4ClO_4$ and aluminum which has been agglomerated with a silane inorganic polymer. This FRP is expected to yield propellants to unusually high burning rate and pressure exponent. The silane polymer in this case serves the dual functions of burning rate accelerator and FRP binder.

EXAMPLE VI

A filler-rich powder (FRP) has been prepared by the use of a solution precipitation technique as described below 174.2 g. Viton-A (a Du Pont fluoro-hydrocarbon polymer) was dissolved in 1000 g. acetone with moderate agitation. 245.0 g. $NH_4ClO_4$ ($6\mu$), 43.5 g. Teflon, and 898.3 g. boron ($2-4\mu$) were added to this solution. Agitation speed was increased to approximately 500 r.p.m. from 100 r.p.m. so that the solid particles would not settle out. 1250 ml. hexane, a non-solvent for Viton-A, was added at a slow rate (approximately 60 cc./min.) to precipitate out the polymer which adheres to the surface of solid particles. Filler-rich particles were formed as a result of collision and agglomeration of the coated particles. After the solid particles were separated from the liquid by decantation, these particles were washed with hexane and oven dried. The resulting FRP contained 66.0% AP, 18.00% boron, 12.8% Viton-A and 3.2% Teflon.

Precipitation conditions, such as agitation speed, rate of hexane addition, solid concentration before hexane adition, etc., may be adjusted to yield desired particle sizes. Agglomerated spheroidal particles of 50 to 300μ have been prepared using this technique.

We claim:

1. A filler-rich powder adapted for incorporation in a solid propellant comprising by weight from 80% to 99% of filler particles and 20% to 1% of a polymeric binder, said filler particles comprising ammonium perchlorate or boron or aluminum or mixtures thereof, with at least 95% of the filler particles being in the range of about 0.1 micron to about 2000 microns in size, said filler-rich powder having an average mesh size in the range of about 20 to about 325.

2. A filler-rich powder in accordance with claim 1 wherein the filler particles have a coarse fraction making up 50% to 90% by weight of the particle mixture and a fine fraction making up 50% to 10% by weight of the particle mixture with an average particle diameter ratio of coarse to fine being greater than about 5.

3. A filler-rich powder adapted for incorporation in a solid propellant comprising by weight from 80% to 99% of filler particles and 20% to 1% of a polymeric binder, said filler particles comprising ammonium perchlorate or boron or aluminum or mixtures thereof, said filler particles being less than 2000μ but greater than 0.1μ in size, and having proper size distribution to give high bulk density for good processability, said distribution being in the range of 50% to 90% by weight coarse and 50% to 10% fine with an average particle diameter ratio of >5, said filler-rich powder having an average mesh size in the range of about 20 to about 325.

4. A filler-rich powder in accordance with claim 1 wherein the polymeric binder is polyurethane or a polysiloxane or an epoxy resin.

5. The method of preparing a filler-rich powder in any desired size for optimum processing and casting into a solid rocket propellant which comprises interblending finely divided filler particles comprising boron or ammonium perchlorate or aluminum or mixtures thereof, with a curable polymer binder having a low initial viscosity with the filler particles comprising by weight from 80% to 99% and with the polymeric binder comprising 20% to 1% of the blend, said filler particles being at least 95% within the range of about 0.1 micron to about 2,000 microns in size, thereafter forming a filler-rich polymeric cake and subsequently grinding said cake to the desired powder size.

6. The method of claim 5 wherein the finely divided particles includes boron having a particle size of about 4 microns.

7. The method of claim 5 wherein the polymer binder is a polyurethane or a polysiloxane.

8. The method of claim 5 wherein the filler-rich powder has a particle size in the range of about 20 to about 325 mesh.

References Cited
UNITED STATES PATENTS

| | | | |
|---|---|---|---|
| 3,030,243 | 4/1962 | Hart | 149—42 |
| 3,162,558 | 12/1964 | Bishop et al. | 149—42 X |
| 3,171,764 | 3/1965 | Parker et al. | 149—42 X |
| 3,257,801 | 6/1966 | Martinez et al. | 149—42 X |
| 3,347,721 | 10/1967 | Jago | 149—42 X |

STEPHEN J. LECHERT, JR., Primary Examiner

U.S. Cl. X.R.

149—19, 20, 42, 44, 76, 110, 113, 114; 260—37 SB, 37 EP, 37 N; 264—3 C